Dec. 25, 1934.   R. BERTHON   1,985,398

ILLUMINATING DEVICE FOR GOFFERED FILMS

Filed Feb. 28, 1929

INVENTOR:
Rodolphe Berthon
BY
ATTORNEY

Patented Dec. 25, 1934

1,985,398

UNITED STATES PATENT OFFICE 1,985,398

ILLUMINATING DEVICE FOR GOFFERED FILMS

Rodolphe Berthon, Neuilly, France, assignor, by mesne assignments, to Kislyn Corporation, New York, N. Y., a corporation of Delaware Application February 28, 1929, Serial No. 343,297 In France March 5, 1928

3 Claims. (Cl. 88—16.4)

Persons skilled in the art are aware that in order to photograph coloured images on goffered films juxtaposed trichrome filters have to be arranged on the diaphragm of the picture taking camera; the pupil of emergence of the lens will then illuminate the film after the fashion of a perfectly diffusing body every point of which would emit radiations (in a line with those received from the object space).

In order to illuminate properly a goffered film for projecting or copying purposes, the first condition to be fulfilled is strictly to reconstitute a ray-path which is the reverse of the picture taking one.

Therefore, the size, position and form of the pupil of emergence of the picture taking camera should, first of all, be calculated. The object of my invention is to provide an optical device adapted to permit of reproducing in space, as to position, size and form, an image of said pupil by means of a light beam in the path of which the goffered film to be projected or to be copied will be interposed. Automatically, rays passing through the film will travel therethrough under incidences identical with those of the rays that served to form the image when the latter was photographed.

Figure 1:
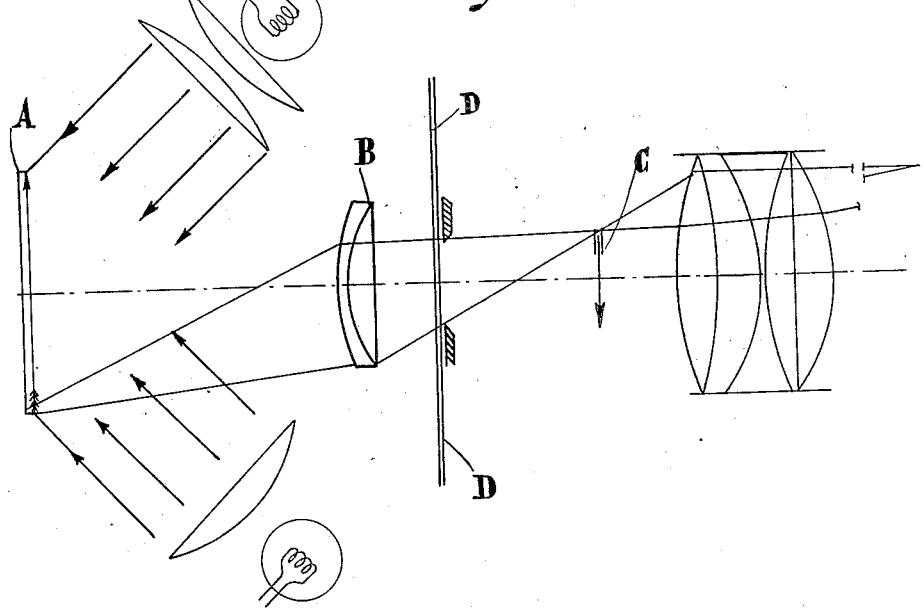
Figure 3:
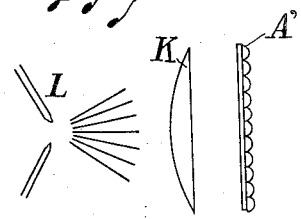
Figure 2:
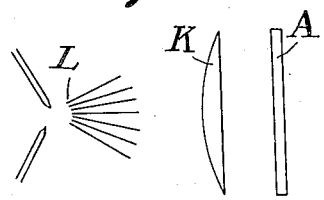

In the accompanying drawing, Figure 1 is a view in diagrammatic section, along the optical axis of the system, illustrating the device which constitutes the subject matter of my invention; and Figs. 2 and 3 are views of a modification.

In Fig. 1, A is a diffusing surface highly illuminated preferably by reflection. Said surface may have any desired dimensions, but its form or shape must be the same as the one of the pupil to be reproduced and its arrangement on the optical axis must be non-symmetrical with respect to said pupil.

B is a lens having an aperture larger than the one of the lens that served for taking the picture. Its focus and its position between the plane of the diffusing surface A and the plane of the pupil to be reproduced should be so determined that said lens will give on its extending optical axis a clear image of the pupil reproduced as to size, position and form. Since the rays of light which form the pupil of emergence of the taking lens are divergent, and since the pupil of emergence equals the aperture of the taking lens, the lens which forms or rather reforms the pupil of emergence in the projection system, and also the projection lenses themselves, should have larger apertures than the aperture of the taking lens. This being so, the projection system will necessarily be non-symmetrical.

C is the image of the pupil of the picture taking camera reproduced in space by lens B as to size, position and form.

D is the plane wherein the film to be projected is set, which plane is so determined that it will occupy, with respect to image C of the pupil, the exact position that it occupied, when the picture was taken, relatively to the pupil of emergence of the picture taking camera.

Without any further explanation, it will be realized that rays passing from diffusing surface A to image C through lens B will travel through the film, set at D, under incidences identical to those of the rays issuing from the pupil of emergence of the picture taking camera on printing-exposure.

Said device does away with any collimation of the pupil of emergence with respect to the plane of the film and ensures perfect rendering of the image, provided that image C of the pupil is projected into space as to position, size and form. As concerns form, especially, if the picture taking camera comprises a diametrical linear diaphragm, the pupil of emergence would itself assume a linear form; in such a case, the diffusing surface A should itself be in the form of a rectilinear diffusing band.

Lastly, in the case where a much enlarged and highly luminous projection is desired, I may, without departing from the characteristics of my invention, replace the reflectively-illuminated diffusing surface A by a transmittingly-diffusing surface, or even by a net work of juxtaposed refracting elements distributing the projection beam over the whole face of lens B. In this manner, I suppress the loss of light due to the absorbent power of the reflecting surfaces, without, however, changing the path of the rays passing from lens B to image C of the pupil of emergence.

Figs. 2 and 3 illustrate this modification, L indicating an arc lamp, K a condenser, A' (Fig. 3) a glass plate covered with a multitude of polished, lenticular elements arranged in juxtaposed relation, or in steps, as in light-houses. A (Fig. 2) is a simple ground glass plate.

As to projection cameras proper, they may occupy any position on the optical axis of the system, provided only their aperture enables them to take the whole of the rays serving to form image C of the pupil of emergence.

The coloured filters used for projection may themselves occupy in space the position of image C of the pupil of emergence, while they may also be arranged in contact with diffusing surface A. In this case, projection is effected in an apparently paradoxical manner, the filters being set on the source of light side while the goffering of the film faces the opposite direction, looking towards the projection camera proper. This arrangement, however, is the one that ensures maximum clearness or sharpness in projection, since no system of filters is interposed between the film and the camera nor between the lenses of the camera and the projection screen.

I claim as my invention:

1. A lighting or illuminating device for goffered film, comprising a highly-illuminated diffusing surface having the same form or shape as the pupil to be reproduced and being set on the optical axis in a non-symmetrical manner with respect to said pupil; a lens having a relative aperture greater than the one of the picture taking lens and giving in a line with its optical axis a clear image of the pupil to be reproduced as to size, position and form; the film to be projected occupying, with respect to the image of the pupil, substantially exactly the position which it occupied on picture taking with respect to the pupil of emergence of the picture taking camera.

2. A lighting or illuminating device, according to claim 1, in which means are provided for lighting the diffusing surface by reflection.

3. A lighting or illuminating device for goffered film, comprising a highly-illuminated diffusing surface having the same form or shape as the pupil to be reproduced and being set on the optical axis in a nonsymmetrical manner with respect to said pupil, a lens having a relative aperture which at least exceeds the one of the picture taking lens and giving in a line with its optical axis a clear image of the pupil to be reproduced as to size, position and form, the film to be projected occupying, with respect to the image of the pupil, substantially exactly the position which it occupied on picture taking with respect to the pupil of emergence of the picture taking camera.

RODOLPHE BERTHON.